April 26, 1966 W. R. WILLIAMSON 3,248,305

FRESH WATER RECOVERY SYSTEM

Original Filed Aug. 31, 1960

*INVENTOR*
WILLIAM R. WILLIAMSON

BY *Alexander F. Powell*
ATTORNEYS

3,248,305
FRESH WATER RECOVERY SYSTEM
William R. Williamson, Wethersfield, Conn., assignor to American Machine & Foundry Company, a corporation of New Jersey
Continuation of application Ser. No. 53,081, Aug. 31, 1960. This application Apr. 18, 1963, Ser. No. 274,391
4 Claims. (Cl. 202—180)

This is a continuation of my copending application, Serial Number 53,081, filed August 31, 1960, now abandoned.

This invention relates to evaporator means for the recovery of fresh water from sea water or other water containing chemicals and/or bacteria which for present purposes are considered to be contaminants, and more particularly to apparatus employing mechanical refrigeration in combination with distillation to produce fresh water with good overall efficiency.

It is a principal object of this invention to provide novel water distillation means particularly well adapted for the efficient recovery of fresh water in limited quantity, such as might be required for use in coastal homes or aboard vessels. Since the present invention is expected to find particular utility in the recovery of fresh water from the sea, the present specification is drawn and described in terms of sea water distillation, although it is not limited to this particular use.

Another important object of the invention is to provide apparatus which operates on a heat pump cycle employing a combination of commercially available equipment and refrigerants in a closed heat pump cycle which provides operating economies comparable with and in some respects more favorable than the electrodialysis and the vapor-compression means known in the prior art, as shown by the following table taken from test data:

| Process | Economy, kwhr./1,000 gals. | Product purity,[2] p.p.m. |
|---|---|---|
| Electrodialysis | 210 | 500 |
| Distillation vis Vapor Compression [1] | 257 | 2 |
| Distillation vis Heat Pump | 235 | 2 |

[1] Actual test data from 1000 gallons per day plant.
[2] Assumes 35,000 p.p.m. total dissolved solids in raw feed.

According to one form of the present novel invention a compressor is employed to pressurize the refrigerant in one heat-exchange zone of a closed vessel and the pressurized refrigerant is then expanded through an expansion valve into another heat-exchange zone within the vessel, thereby pumping heat from one zone to the other. Sea water is introduced into the heated zone where it is vaporized and sent to the cooled zone where it is condensed and the condensate drained off. The heat of condensation serves to reboil the refrigerant which is then recycled to the heated zone by the compressor to help vaporize the sea water. It is an important feature of the present invention that the condensing of the water vapor creates a partial vacuum within the sealed chamber and thereby permits the raw sea water to be vaporized at a relatively low temperature, and, since a high percentage of the heat is recovered by the refrigerant in the cooled condensing zone, the compressor need only supply losses while raising the temperature level of the recovered heat to keep the process going.

It is also an important object of this invention to provide apparatus in which the raw sea water is vaporized at reduced pressure and at such a low temperature that there is little tendency toward scaling in the heated heat-exchange zone of the chamber. For instance by using Freon-12 as the refrigerant, very low boiling temperatures can be utilized which make it unnecessary to use costly chemical feed water treatment to hold scale formation to a minimum. Moreover, because of the low temperature polyvinyl chloride can be used for constructing the shell of the chamber and aluminum can be used in the heat exchanger coils, and perhaps also adding a simple heavy-metals filter to prevent corrosion of the aluminum.

Still another object of the invention is to provide apparatus requiring a total volume of raw water of only about twice the distillation yield, as compared with the five to twenty times ratio required in many of the other types of processes. This difference provides economies in size of the chamber and of the feed pipes and pumps, as well as economies in the power required to drive the pumps.

Moreover, from the point of view of thermodynamics, the present apparatus has certain advantages over some prior art systems, in particular the vapor-compression system. Due to the nature of the refrigerants used in the present refrigeration steps there is more heat dissipated into the sea water by the refrigerant condenser which heats the raw sea water than can be absorbed in the refrigerant evaporator on which the water vapor is condensed. Therefore the feed water line is passed through the cooled zone of the chamber to increase the condensation of the vapor while at the same time warming the feed water. Also, a reasonable amount of heat loss due to radiation can be tolerated which can not be tolerated in a vapor-compression system wherein a compensating amount of heat must be continually added to the cycle, usually employing expensive triple-tube heat exchangers, to prevent instability and large operational fluctuations.

Another object of the invention is to provide apparatus of the type described which is well adapted to function either partly or wholly on waste heat from air conditioners or other domestic sources or on waste heat from the cooling systems of engines. As an example, if ample circulating water is available, the present process will recover 100 to 200 gallons per day utilizing the waste heat from a 3- to 5-ton air conditioner and at the same time serving as an efficient heat sink therefor. On the other hand, where the refrigeration cycle is employed solely for the conversion of sea water and has its condenser disposed in the chamber to vaporize the sea water and its evaporator disposed in the chamber to recondense the vapor, a normal 3-ton refrigeration system will convert about 200 gallons per day, these figures being subject to substantial improvement if a refrigerant can be found having better heat-transfer characteristics than Freon.

Still another object of the invention is to provide a compressor-refrigeration system operating on a closed cycle where the refrigeration condenser serves to vaporize the sea water and the evaporator serves to condense the vapor, a further optional improvement in the apparatus including the addition of sufficient heat exchange capacity to the cooled zone of the chamber to make up for efficiency losses in the refrigeration system. The present system contemplates the passing of the raw sea water intake through the cooled zone both to increase the condensation of the water vapor therein and to preheat the raw sea water before pumping it into the heated chamber zone. Assuming that the refrigeration cycle is about 80% efficient, an additional 20% cooling effect in the cooled zone of the chamber can be provided by this means. Still a further optional improvement can be had by passing this sea water under pressure to an inductor or jet-type vacuum pump and connecting the latter with the chamber to increase the vacuum therein particularly by exhausting non-condensing gases therefrom. This step adds considerably to the efficiency of the process and further reduces the difference in temperature required to boil and to condense the sea water.

Another object of the invention is to provide recovery apparatus which delivers fresh water which is also sterile. As stated above, the operating temperatures can be reduced to rather low values, around 100° F., with the result that droplets from the heated zone of the chamber do not carry over into the cooled zone of the chamber to contaminate the condensate. This has been proven by actual biological tests on a working prototype embodying the present invention.

Other objects and advantages of the present invention will become apparent during the following explanation of the invention with reference to the figures of the drawing, wherein.

Figure 1:
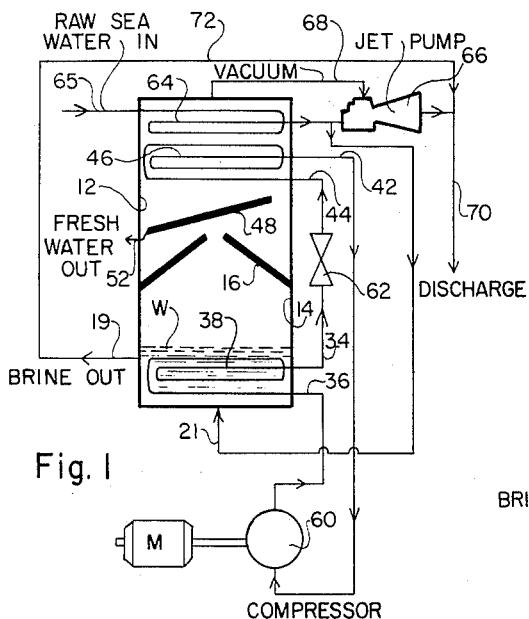
FIG. 1 is a flow diagram illustrating the present invention employing a closed refrigeration cycle.

Referring now to the drawing, wherein like reference numerals designate similar parts in the figures, the present system is illustrated with reference to an embodiment of an apparatus comprising a sealed vessel in the form of a tank 10 having an upper chamber 12 and a lower chamber 14 separated by a frusto-conical baffle 16, the structure being best illustrated in FIG. 3. The tank 10 is divided at opposed flanges 18 and 20 which are normally transfixed by bolts 22 to hold the upper and lower portions of the tank together. This construction permits the tank to be readily disassembled for cleaning. Such cleaning need be done only at infrequent intervals since the upper chamber 12 is contacted only by the vapor from the sea water, and the lower chamber 14, though containing boiling sea water, has relatively little tendency to scale because of the low boiling temperature. Moreover, the lower chamber 14 is continuously flushed by the flow of sea water therethrough, as will be more fully explained hereinafter.

The baffle 16 is secured to the tank 10 around its lower periphery and has an aperture 17 through its upper reduced-diameter portion which is attached to a cylindrical sleeve 24 supporting a wire mesh separator or demister 26 comprising a labyrinth of wire serving, in a manner well known per se, to remove entrained liquid from vapors flowing from the heated lower chamber 14 to the upper condensing chamber 12 through the aperture 17. Near its lower periphery, the baffle 16 is provided with an opening 28 which communicates with a pipe 30 through which liquids tending to collect above the baffle 16 drain back into the lower chamber 14.

Figure 2:
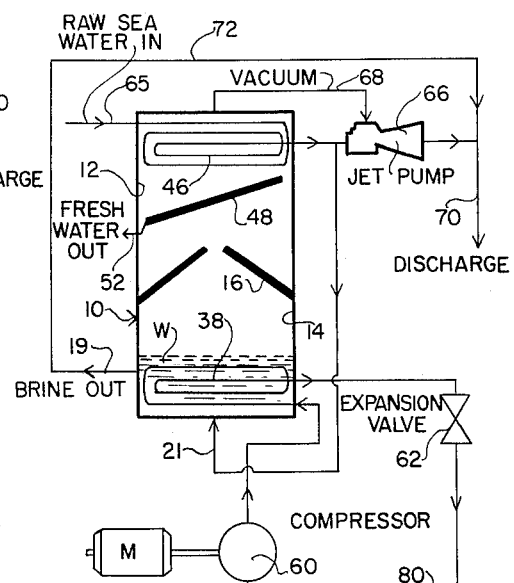
FIG. 2 is a modified flow diagram illustrating the present invention employing the waste heat from an air conditioning system.

The tank has a lower entrance 32 through which the pipes 34 and 36 are connected to lower heat exchange tubes 38, and further has an upper entrance 40 through which the pipes 42 and 44 are connected to the upper heat exchange tubes 46, see also FIGS. 1 and 2. A trough 48 is disposed below the heat exchange tubes 46 to collect the fresh water condensate and deliver it to a sump 50 from which the water can be withdrawn through a pipe 52, or drained through a drain 54.

In the lower chamber 14 a weir 15 serves to establish the level of the raw sea water W above the heat exchange tubes 38, and a drain 19 for the brine flushed by a continuous flow of sea water through the lower chamber 14 is provided. This sea water intake tube is shown at 21 which may also serve as a drain through which the lower chamber 14 can be emptied.

Figure 3:
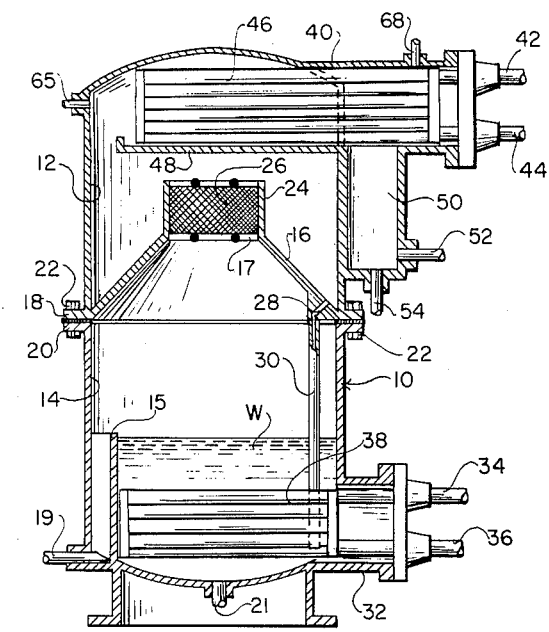
FIG. 3 is a cross-sectional view illustrating a two-zone distillation apparatus according to the present invention.

Referring now to FIG. 1, which comprises a diagram schematically including a tank similar to the tank 10 of FIG. 3, a first embodiment of the system employs a closed refrigeration cycle in which a motor M drives a refrigerant compressor 60 compressing the refrigerant and raising its temperature in the heat exchange tubes 38 which within the closed refrigeration cycle comprise the condenser coils. The refrigerant is then expanded in a valve 62 and delivered to another set of heat exchange tubes which within the closed cycle of the refrigerant comprise the evaporator coils. In FIG. 1, this evaporator comprises the coils 46 in the upper chamber 12 of the tank 10, and in the embodiment of FIG. 2 this evaporator comprises one side of a heat exchanger 80, to be more fully described hereinafter.

Referring again to FIG. 1, the refrigeration cycle heats the coils 38 and cools the coils 46, both sets of coils being within the sealed tank 10. Raw sea water is introduced into the lower chamber 14 through the inlet pipe 21 at a sufficient rate to keep the water level W at a constant height and to overflow the weir 15. The heat from the coils 38 causes the water W to boil and the vapor passes upwardly through the aperture 17 in the baffle 16 and condenses on the upper coils 46. This condensation creates and maintains a vacuum in the tank 10 which lowers the pressure well below atmospheric. Therefore, the sea water will boil at a temperature far below 212° F., depending upon the amount of vacuum. In actual tests using the system shown in FIG. 1 the process has been carried out with the water boiling at 70° F. in the presence of a vacuum approaching 0.3 inch of mercury. This is as low a temperature as the present system has been operated at, although still further reductions are possible. On the other hand, it is desirable not to exceed a boiling temperature of about 140° F. when treating sea water, since excessive scaling sets in at temperatures thereabove. Sea water will boil at 140° F. in the presence of a vacuum of about 6 inches of mercury. In the upper chamber, the process has been carried out with temperatures at the coil 46 ranging from about 30° F. to 120° F., the coil 46 being maintained at a temperature below the condensation temperature of the vapor at the then-existing vacuum level.

A practical set of operating conditions, presented herein as a non-limiting example, is as follows: Using Freon-12, the temperature of the compressed refrigerant in the coils 38 is 102° F., the water itself boiling at about 90° F., and the compressed refrigerant being then expanded in the valve 62 down to about 80° F. for condensing the vapor.

As stated in the objects of this invention, it is desirable, although not necessary, to provide an auxiliary coil 64, FIG. 1, to augment the condensing coil 46. This auxiliary coil 64 is advantageously connected to receive sea water from a pressure pump (not shown) through a pipe 65. Note that if the coil 46 can efficiently condense the vapor at 80°, it is very probable that the sea water in the coil 64 would even be below this temperature and would therefore be highly effective. Moreover, the vapor gives up some of its heat to the sea water in the coil 64 and thereby preheats the sea water which is then advantageously introduced into the lower chamber 14 through the pipe 21.

In addition, a jet-vacuum pump 66 is coupled to the output of the coil 64 and is used to draw a better vacuum for the tank 10 through a line 68. The jet pump 66 is particularly useful in at least two respects. When the system is in full operation, it serves to evacuate non-condensing gases which enter the tank 10 dissolved in the sea water. It also helps to start the process by drawing the initial vacuum on the tank 10 which is necessary to permit the water to start boiling at the low temperatures set forth in the above numerical examples. When the process is to be begun, the jet pump 66 is operated for some time before the compressor is started. This pulls an initial vacuum on the tank 10, which vacuum has reached as low a value as 0.3 inch of mercury in actual tests with only the pump 66 operating. When a satisfactory vacuum has been attained, the motor M is started and the apparatus begins to function as soon as sufficient heat has been transferred from the coils 38 to the water.

FIG. 2 shows a modification in which the coils 46 are not included in the refrigeration cycle, but are connected between the sea water inlet pipe 65 and the jet-vacuum pump 66. In other words, the condensation of the vapor in the upper chamber 12 is entirely accomplished by the transfer of heat into the sea water in the coils 46. However, much of this heat is discharged through the pump 66 and into the overboard discharge pipe 70 along with the brine from the pipes 19 and 72, and therefore heat must be added to the system. This is done by the heat exchanger 80, one path through which comprises the evaporator of the closed refrigeration system which is also coupled with the coils 38 which serve as its condenser. The other path through the heat exchanger 80 is coupled to an air conditioner unit 74, or other source of waste heat. Thus, the heat exchanger 80 serves as a heat sink for the air conditioner 24.

I do not limit my invention to the specific illustrations disclosed, for changes are possible within the scope of the following claims.

I claim:

1. A water evaporator comprising
   (a) a tank,
   (b) an inclined partition secured in the tank and dividing it into a lower boiling chamber and an upper condensing chamber, the lower end of said partition being connected to a side wall of the tank to provide a sump, and including means for draining the sump into said boiling chamber,
   (c) demister means communicating from the lower chamber into the upper chamber,
   (d) means for admitting water into said boiling chamber,
   (e) water heating tubes in said boiling chamber having an inlet and an outlet,
   (f) vapor condensing means having inlet means connected to receive sea water and having outlet means including two branches, the condensing means being located in said condensing chamber,
   (g) means connecting one branch of the outlet means of said condensing means to the means for admitting water to the boiling chamber,
   (h) means beneath the condensing means for collecting condensate and withdrawing it from the tank,
   (i) eductor means having a suction connection connected with the upper chamber and having a liquid flow circuit connected to the other branch of the condensing means, and
   (j) means for circulating a refrigerant through said heating tubes, means including a closed refrigerant circuit including a compressor having an intake and having an outlet conduit connected with the inlet of said heating tubes, expansion valve means having one side connected to the outlet of said heating tubes, and other refrigerant tube means connecting the other side of the valve means to the compressor intake.

2. A raw water evaporator comprising
   (a) a tank,
   (b) a downwardly flared frusto-conical partition secured in the tank and dividing it into a lower boiling chamber and an upper condensing chamber, and the lower end of said partition cooperating with the wall of the tank to provide a peripheral sump having means for draining the sump into said boiling chamber,
   (c) demister means communicating from the lower chamber into the upper chamber,
   (d) means for admitting water into said boiling chamber,
   (e) water heating tubes in said boiling chamber and having an inlet and an outlet,
   (f) first vapor condensing tubes having an inlet connected to receive water and having an outlet including two branches, and a second vapor condensing tube having an inlet and an outlet, and both located in said condensing chamber,
   (g) means connecting one branch of the outlet of said first condensing tubes to the means for admitting water to the boiling chamber,
   (h) means beneath the condensing tubes for collecting condensate and withdrawing it from the tank,
   (i) eductor means having a suction connection connected with the upper chamber and having a liquid flow circuit connected to the other branch of the first condensing tubes, and
   (j) means for circulating a refrigerant through said heating tubes and said second condensing tubes, this means including a compressor having an outlet conduit connected with the inlet of said heating tubes, expansion valve means connecting the outlet of said heating tubes to the inlet of said second condensing tubes, and means for connecting the outlet of said second condensing tubes to the inlet of said compressor.

3. A raw water evaporator comprising
   (a) a tank,
   (b) a downwardly flared frusto-conical partition secured in the tank and dividing it into a lower boiling chamber and an upper condensing chamber, and the lower end of said partition cooperating with the wall of the tank to provide a peripheral sump having means for draining the sump into said boiling chamber and said boiling chamber having raw water admitting means,
   (c) demister means communicating from the lower chamber into the upper chamber,
   (d) water heating tubes in said boiling chamber and having an inlet and an outlet,
   (e) vapor condensing tubes having an inlet connected to receive water and having an outlet including two branches and said tubes being located in said condensing chamber,
   (f) means connecting one branch of the outlet of said condensing tubes to the means for admitting water to the boiling chamber,
   (g) means beneath the condensing tubes for collecting condensate and withdrawing it from the tank,
   (h) eductor means having a suction connection connected with the upper chamber and having a liquid flow circuit connected to the other branch of the condensing tubes, and
   (i) means for circulating a refrigerant through said heating tubes, this means including a compressor having an outlet conduit connected with the inlet of said heating tubes, a heat exchanger including two flow paths therethrough, expansion valve means connecting the outlet of said heating tubes to the inlet to one path of said heat exchanger, means for connecting the outlet of said path to the inlet of said compressor, and means for circulating a heated fluid through the other path of the heat exchanger.

4. A raw water evaporator system comprising
   (a) a tank for containing water to be evaporated;
   (b) eductor means having a liquid flow path and having a vacuum path connected to the tank for applying a partial vacuum to the water to be evaporated;
   (c) a refrigeration system having a hot side;
   (d) means in the tank for applying heat to the water to be evaporated, said latter means comprising a first heat exchanger communicating on one side with the water to be evaporated and connected on the other side with the hot side of the refrigeration system to receive heat therefrom;
   (e) means connected with the tank for cooling and condensing evaporating water vapor and comprising a second heat exchanger;
   (f) means for feeding raw water through said second heat exchanger and then through said tank, and further means for feeding a portion of the water that has passed through said second heat exchanger through the eductor liquid path; and (g) means for recovering condensed water vapor.

References Cited by the Examiner

UNITED STATES PATENTS

| | | | |
|---|---|---|---|
| 585,365 | 6/1897 | Skiffington | 202—185.2 |
| 1,466,670 | 9/1923 | Monti | 202—75 |
| 1,851,266 | 3/1932 | Todd | 202—52 X |
| 1,920,307 | 8/1933 | Hechenbleikner et al. | 202—52 |
| 2,388,328 | 11/1945 | Jacobs. | |
| 2,489,703 | 11/1949 | Cook et al. | 202—52 |
| 2,516,093 | 9/1950 | Ruff | 202—75 X |
| 2,625,505 | 1/1953 | Cross | 202—52 |
| 2,643,974 | 6/1953 | Impagliazzo | 202—72 X |
| 2,759,882 | 8/1956 | Worthen | 202—174 X |
| 2,908,618 | 10/1959 | Bethon | 202—174 |
| 2,960,449 | 11/1960 | Williamson | 202—197 X |

FOREIGN PATENTS

K 24,930   12/1956   Germany.

NORMAN YUDKOFF, *Primary Examiner.*

GEORGE D. MITCHELL, *Examiner.*